US010947959B2

(12) United States Patent
Numajiri

(10) Patent No.: US 10,947,959 B2
(45) Date of Patent: Mar. 16, 2021

(54) METHOD AND APPARATUS OF PERFORMING MAINTENANCE ON A WIND TURBINE COMPONENT

(71) Applicant: MHI Vestas Offshore Wind A/S, Aarhus N (DK)

(72) Inventor: Tomohiro Numajiri, Viby J (DK)

(73) Assignee: MHI Vestas Offshore Wind A/S, Aarhus N (DK)

(*) Notice: Subject to any disclaimer, the term of this patent is extended or adjusted under 35 U.S.C. 154(b) by 148 days.

(21) Appl. No.: 16/323,083

(22) PCT Filed: Aug. 11, 2017

(86) PCT No.: PCT/DK2017/050260
§ 371 (c)(1),
(2) Date: Feb. 4, 2019

(87) PCT Pub. No.: WO2018/041313
PCT Pub. Date: Mar. 8, 2018

(65) Prior Publication Data
US 2019/0203700 A1 Jul. 4, 2019

(30) Foreign Application Priority Data
Aug. 29, 2016 (DK) .......................... PA 2016 70658

(51) Int. Cl.
F03D 80/50 (2016.01)
B66C 1/10 (2006.01)
(Continued)

(52) U.S. Cl.
CPC .............. F03D 80/50 (2016.05); B66C 1/108 (2013.01); B66C 23/185 (2013.01);
(Continued)

(58) Field of Classification Search
CPC ......... F03D 80/50; F03D 13/10; B66C 1/108; B66C 23/185; F05B 2230/80; F05B 2230/61
See application file for complete search history.

(56) References Cited

U.S. PATENT DOCUMENTS

| 6,039,194 A * | 3/2000 | Beeche | ................... B66C 23/20 |
| | | | 180/411 |
| 2002/0095878 A1* | 7/2002 | Henderson | .............. F03D 13/20 |
| | | | 52/116 |

(Continued)

FOREIGN PATENT DOCUMENTS

| CN | 185664 A | 11/2006 |
| CN | 101432216 A | 5/2009 |

(Continued)

OTHER PUBLICATIONS

China National Intellectual Property Administration, First Notification of Office Action in CN Application No. 201780063834.9, dated Nov. 1, 2019.

(Continued)

Primary Examiner — Ninh H. Nguyen
Assistant Examiner — Brian Christopher Delrue
(74) Attorney, Agent, or Firm — Wood Herron & Evans LLP

(57) ABSTRACT

A method of performing maintenance on a wind turbine component (18, 22, 24) of a wind turbine (10) having an integrated lifting apparatus (40). The method includes lifting a first temporary support (104) using the integrated lifting apparatus (40), coupling the first temporary support (104) to the nacelle (12) or the hub (16) and the integrated lifting apparatus (40), removing the wind turbine component (18, 22, 24) using the integrated lifting apparatus (40) and the first temporary support (104) in combination. The method may further include installing a replacement wind turbine (Continued)

component (18, 22, 24) using at least a part of the integrated lifting apparatus (40) and the first temporary support (104) in combination, decoupling the first temporary support (104) from the nacelle (12) or the hub (16) and the integrated lifting apparatus (40), and removing the first temporary support (104) from the wind turbine (10) using the integrated lifting apparatus (40). A system for performing maintenance on a wind turbine component (18, 22, 24) is also disclosed.

19 Claims, 14 Drawing Sheets

(51) Int. Cl.
*B66C 23/20* (2006.01)
*B66C 23/18* (2006.01)
*B66C 23/70* (2006.01)
*F03D 1/00* (2006.01)

(52) U.S. Cl.
CPC .......... *B66C 23/207* (2013.01); *B66C 23/701* (2013.01); *F03D 1/00* (2013.01); *F05B 2230/61* (2013.01); *F05B 2230/80* (2013.01); *Y02E 10/72* (2013.01); *Y02P 70/50* (2015.11)

(56) References Cited

U.S. PATENT DOCUMENTS

| | | | | |
|---|---|---|---|---|
| 2010/0254813 | A1* | 10/2010 | Dawson | B66D 1/60 416/146 R |
| 2011/0135478 | A1* | 6/2011 | Kappel | B66C 23/207 416/146 R |
| 2012/0328442 | A1* | 12/2012 | Davis | F03D 1/0691 416/204 R |
| 2016/0040649 | A1* | 2/2016 | Smith | B66C 23/207 415/121.3 |
| 2016/0369778 | A1* | 12/2016 | Davis | E04H 12/342 |
| 2017/0067447 | A1* | 3/2017 | Reynolds | B66C 1/108 |
| 2019/0226460 | A1* | 7/2019 | Madsen | B66C 23/207 |
| 2019/0338757 | A1* | 11/2019 | Helmens | F03D 13/40 |

FOREIGN PATENT DOCUMENTS

| | | | | |
|---|---|---|---|---|
| CN | 103764541 | A | 4/2014 | |
| EP | 1291521 | A1 | 3/2003 | |
| EP | 1677006 | A2 | 7/2006 | |
| EP | 1677007 | A2 | 7/2006 | |
| EP | 2147885 | A1 * | 1/2010 | ............ B66C 23/06 |
| EP | 2369174 | A1 | 9/2011 | |
| EP | 2520533 | A1 | 11/2012 | |
| WO | 9610130 | A1 | 4/1996 | |
| WO | 2008069818 | A1 | 6/2008 | |
| WO | 2012107049 | A1 | 8/2012 | |
| WO | 2015078475 | A1 | 6/2015 | |

OTHER PUBLICATIONS

Danish Patent and Trademark Office, Search and Exam Report in PA 2016 70658, dated Feb. 28, 2017.

European Patent Office, International Search Report and Written Opinion in PCT Application No. PCT/DK2017/05060, dated Nov. 10, 2017.

* cited by examiner

METHOD AND APPARATUS OF PERFORMING MAINTENANCE ON A WIND TURBINE COMPONENT

TECHNICAL FIELD

The invention relates to a method and apparatus of performing maintenance on a wind turbine component, particularly using at least one temporary support in combination with an integrated lifting apparatus.

BACKGROUND

Large, utility-scale horizontal-axis wind turbine generators (HAWTs) typically include a plurality of rotor blades mounted to a supporting structure, usually in the form of a tubular tower. In such HAWTs, the generating components, including the generator, gearbox, drive train and brake assembly, are located at the top of a tower in a nacelle behind the hub of the rotor blades.

Maintenance of wind turbine components within the nacelle may be performed by personnel having access to the interior of the nacelle. For example, a suitable ladder system may be located within the tower so that personnel can climb to the top of the tower. Alternative access options are for personnel to be flown to the wind turbine generator by helicopter and winched zo onto the nacelle for personnel to be conveyed to the nacelle by a 'cherry picker platform' provided by a ground-based crane for an on-shore wind turbine.

Further, it is generally known to install an integrated lifting apparatus within the nacelle in order to help personnel repair and/or replace various components. For example, WO2012/107049 describes an internal lifting apparatus that is mounted within the nacelle of a HAWT, where the boom of the integrated lifting apparatus is movable in elevation and in azimuth in relation to the nacelle. Additionally, WO2015/078475 describes that the frame structure of the nacelle may include a support structure against which a crane may be brought to rest in a stowed condition to prevent damage caused by oscillations when the wind turbine is in use.

While the integrated lifting apparatus is suitable for replacing smaller wind turbine components, certain large wind turbine components often exceed the lifting capacity of the internal lifting apparatus. These large wind turbine components may include the gearbox and the generator. For example, the typical lifting capacity of the internal lifting apparatus is only about 3 tons, while the generator weighs about 30 tons and the gearbox weighs about 70 tons. Since the weight of either of these large wind turbine components exceeds the lifting capacity of the integrated lifting apparatus, special equipment must be introduced to replace these components. Even though the probability of large wind turbine component failure is low, the associated cost of repairing and/or replacing the large wind turbine component is significant.

Two options are currently employed for replacing large wind turbine components in the wind turbine. First, regarding off-shore wind turbines, a jack-up vessel containing a large independent crane is generally used. The jack-up vessel contains the necessary crane components to remove and replace the large wind turbine component without using the integrated lifting apparatus. Since jack-up vessels are able to replace large wind turbine components, jack-up vessels are generally very large and expensive to operate. In addition to the significant cost associated with utilizing the jack-up vessel, since failure events are unexpected, unplanned downtime caused by such a failure is also very costly. On-shore wind turbines also use large land-based cranes that are also expensive to transport to a wind turbine site and operate. Alternatively, if the integrated lifting apparatus of the wind turbine is made in such a manner as to allow for the large wind turbine components to be removed and replaced merely by using the integrated lifting apparatus, the additional weight and cost of such a structure would make this option also undesirable.

Accordingly, there is a need for an improved method of performing maintenance on a wind turbine component, where the weight of the large wind turbine component to be removed exceeds the capacity of the integrated lifting apparatus, without the need for heavy permanent modifications to the integrated lifting apparatus or using expensive jack-up vessels and cranes.

SUMMARY

A method of performing maintenance on a wind turbine component of a wind turbine is disclosed. The wine turbine includes a tower, a nacelle, a hub, and at least one rotor blade. The wind turbine further includes an integrated lifting apparatus. The method comprises lifting a first temporary support using at least part of the integrated lifting apparatus of the wind turbine and coupling a first end of the first temporary support to the nacelle or the hub and a second end of the first temporary support to the integrated lifting apparatus. The wind turbine component may then be removed using at least part of the integrated lifting apparatus and the first temporary support in combination. A replacement wind turbine component may then be installed using at least part of the integrated lifting apparatus and the first temporary support in combination. The method further includes decoupling the first end of the first temporary support from the nacelle or the hub and the second end of the first temporary support from the integrated lifting apparatus and removing the first temporary support from the wind turbine using the integrated lifting apparatus.

In one embodiment, the nacelle includes a frame structure and the first end of the first temporary support includes first and second legs and coupling the first end of the first temporary support further includes coupling the first leg to a first side of the frame structure and coupling the second leg to a second side of the frame structure. Additionally, decoupling the first end of the first temporary support further includes decoupling the first leg from the first side of the frame structure and the second leg from the second side of the frame structure. The first side of the frame structure may include first side upper and lower horizontal members and first side bridging members extending therebetween. The second side of the frame structure may include second side zo upper and lower horizontal members and second side bridging members extending therebetween. The method further includes coupling the first leg to the first side upper horizontal member, the first side lower horizontal member, and/or at least one of the first side bridging members; and coupling the second leg to the second side upper horizontal member, the second side lower horizontal member, and/or at least one of the second side bridging members.

In the various embodiments, the wind turbine component being removed has a weight that exceeds the lifting capacity of the integrated lifting apparatus alone, but does not exceed the lifting capacity of the integrated lifting apparatus and the first temporary support when used in combination. By way of example, the method may include removing a generator or a gearbox from the wind turbine, both of which may exceed the capacity of the integrated lifting apparatus alone, but not the combination of the integrated lifting apparatus and the first temporary support.

In one embodiment, the wind turbine component being removed is in the nacelle. In this case, the method may include lifting the first temporary support into the nacelle through one or more closeable doors located on a top portion of the nacelle. Moreover, the method may further include removing the wind turbine component down through a hatch located on a bottom portion of the nacelle. The step of installing the replacement wind turbine component may then include inserting the replacement wind turbine component up through the hatch in the bottom portion of the nacelle.

In another embodiment, the wind turbine component being replaced is a rotor blade. In this regard, the method further includes lifting a second temporary support using the integrated lifting apparatus and coupling the second temporary support to the nacelle, such as the frame structure. The method further includes removing the rotor blade using at least part of the integrated lifting apparatus, the first temporary support, and the second temporary support in combination. In this embodiment, the integrated lifting apparatus may include an extendible boom, one or more winches, first and second pulley systems, and first and second lifting lines. Removing the rotor blade further includes aligning the first temporary support to the center of gravity of the rotor blade; disconnecting the rotor blade from the hub; lowering the rotor blade using the first and second lifting lines, the first and second pulley systems, and one or more winches, the integrated lifting apparatus and the first zo temporary support in combination; and rotating the rotor blade to be generally perpendicular to the tower. In this regard, the first lifting line, the first pulley system, the integrated lifting apparatus and the first temporary support in combination support a first portion of the rotor blade, and the second temporary support, the second pulley system, and the second lifting line support a second portion of the blade.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

DETAILED DESCRIPTION

Figure 1:
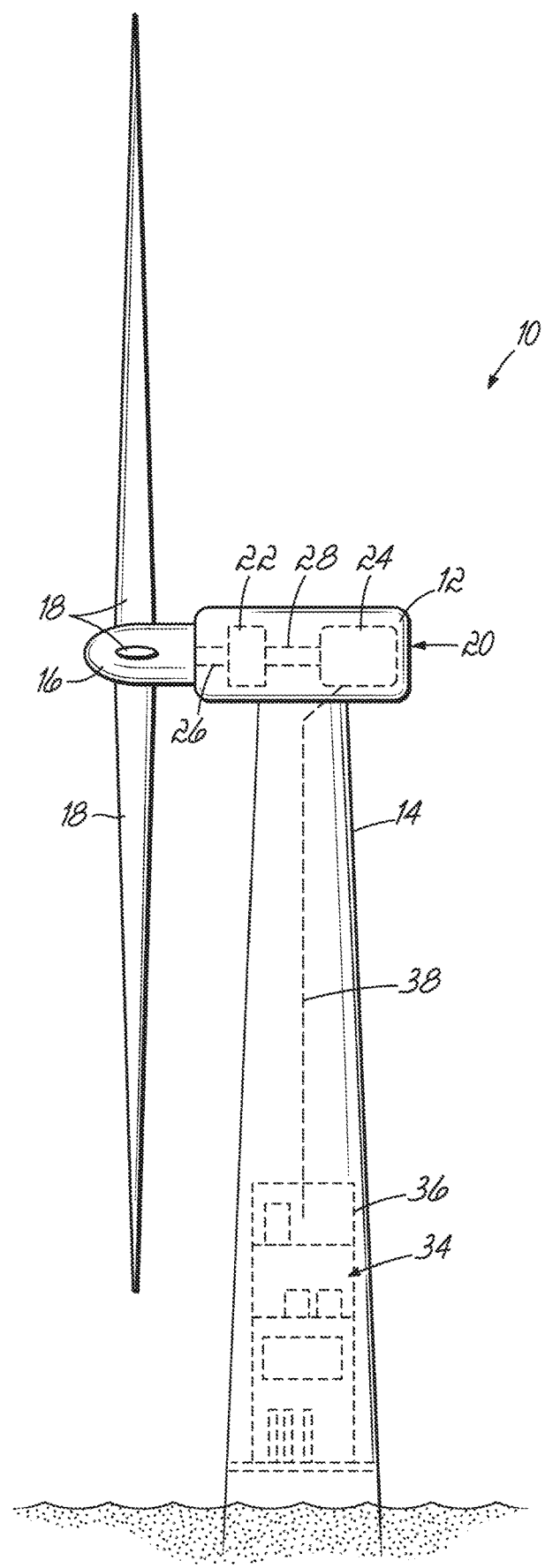
FIG. 1 is a schematic view of a horizontal-axis wind turbine generator.

FIG. 1 shows a schematic view of a wind turbine 10 of the horizontal-axis type (HAWT) as including a nacelle 12 mounted on top of a tower 14, with the tower 14 being mounted on a foundation or footing. The nacelle 12 includes a hub 16 at its front end that carries a plurality of rotor blades 18. Three rotor blades 18 are shown in this embodiment, as is common with large utility-scale generators, however, persons skilled in the art would appreciate that other numbers of rotor blades 18 may also be suitable. Moreover, other tower constructions are also envisioned, for example, a tower 14 defined by a structural lattice framework.

Although many of the individual components are not shown in the figures for clarity, the nacelle shown in FIG. 1 includes a generator set 20 (including a gearbox 22 and a generator 24), a low speed drive shaft 26, and a high speed output shaft 28 (all of which are shown using dashed lines). The generator set 20 enables energy to be recovered from the rotor blades 18, and is driven by the hub 16 through the low speed drive shaft 26. The generator set 20 is typical of a HAWT with the gearbox 22 stepping up the rotational speed of the low speed drive shaft 26 to the high speed output shaft 28 that ultimately drives the generator 24. The generator 24 outputs alternating current (AC) at a voltage and frequency that is determined largely by the rotational speed of the hub 16. The functional components of the nacelle 12 may be mounted to at least one of the frame structure 30 of the nacelle 12, the main shaft bearing zo housing 32, and/or the gearbox 22.

To enable variable speed operation of the wind turbine 10, the alternating current output by the generator 24 is first converted, or 'rectified', to direct current (DC) and is then converted back into alternating current, or 'inverted', at the correct frequency and voltage in order to integrate with the frequency and voltage that is required from the national grid system via supply line (not shown). The process of rectification and inversion is handled by a power system 34 that is contained in an internal tower structure 36 to which the generator 24 is electrically connected by way of a high voltage AC current line 38.

Figure 2:
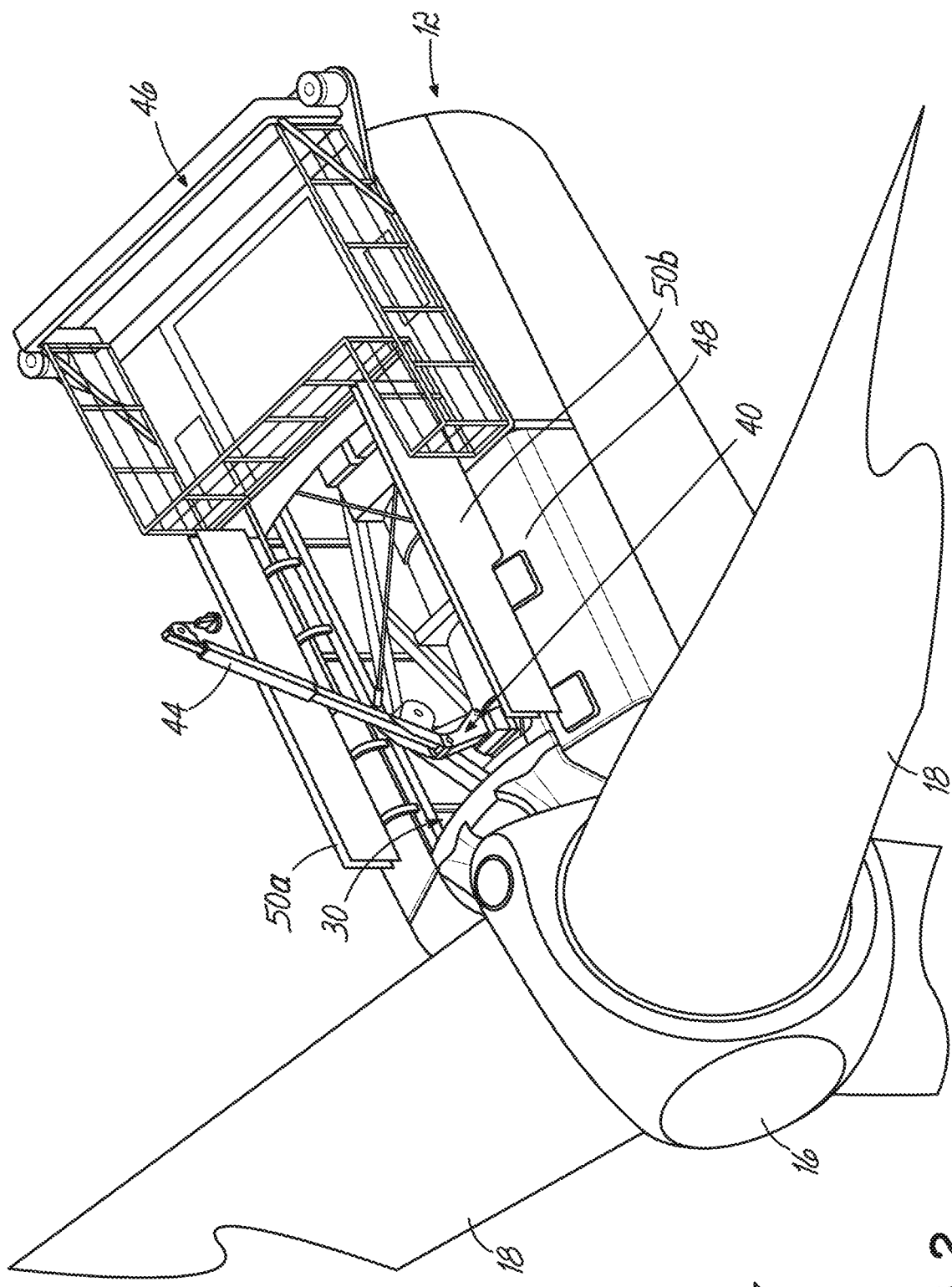
FIG. 2 is a perspective view of a nacelle of a wind turbine that incorporates an integrated lifting apparatus.
Figure 3:
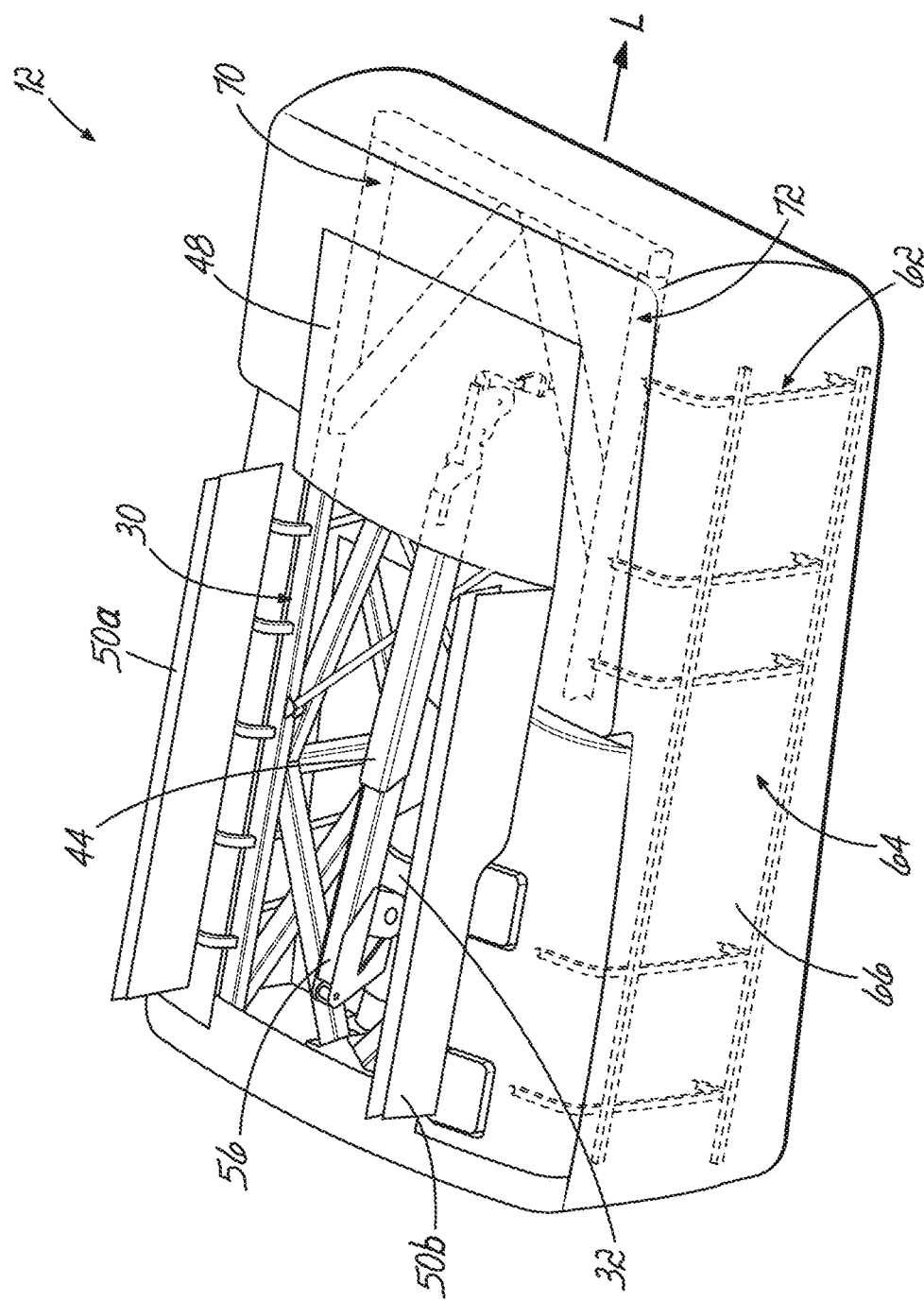
FIG. 3 is a perspective view of a portion of the nacelle in FIG. 2, but from a different viewing angle.

Having described the overall structure of the wind turbine 10, discussion will now turn to the integrated lifting apparatus 40 that is located within the nacelle 12, as shown in FIGS. 2 and 3. According to an exemplary embodiment, the integrated lifting apparatus 40 may be in the form of a cantilevered telescopic boom crane that includes a base 42 fixed to the nacelle 12 and a boom 44 that is articulated on and cantilevered from the base 42. As shown in FIG. 2, and more clearly in the schematic representations of FIGS. 5 and 6, the base 42 of the integrated lifting apparatus 40 is mounted to a main shaft bearing housing 32 of the nacelle 12. Additionally, persons skilled in the art would appreciate that although the integrated lifting apparatus 40 is shown as being located within the nacelle 12, the integrated lifting apparatus 40 may also be located at other locations, for example, within the tower 14.

The integrated lifting apparatus 40 may have three degrees of freedom (telescope, elevate, and slew) allowing for access to many areas of the nacelle 12. For this reason, the integrated lifting apparatus 40 includes a power system (not shown), which is configured to drive the telescopic, elevation and slewing (i.e. azimuth) operations of the boom 44 relative to the base 42. In one exemplary embodiment, the power system may be an electrohydraulic power system. In the deployed condition, the boom 44 may be extended telescopically so as to reach a maintenance platform 46 shown in FIG. 2 that is mounted to the rear of the upper deck 48 of the nacelle 12.

The integrated lifting apparatus 40 is configured to be placed in two conditions or modes: i) a first 'stowed' condition in which the boom 44 is housed within the nacelle 12 and ii) a second 'deployed' condition in which the boom 44 is movable with respect to the base 42 of the integrated lifting zo apparatus 40. As shown in 'stowed' condition of FIG. 3, the integrated lifting apparatus 40 is fixedly mounted to the main shaft bearing housing 32, such that the boom 44 extends in the longitudinal direction 'L' along a centerline of the nacelle 12 and is surrounded by the frame structure 30. When the integrated lifting apparatus 40 is placed in the deployed condition (shown in FIG. 2), the boom 44 is operable to extend out from the confines of the nacelle 12 to reach above the first and second closable doors 50a, 50b that define a roof of the nacelle 12 (when first and second closable doors 50a, 50b are closed). In the deployed condition, the boom 44 is operable to extend in telescopic, elevation and slewing. For example, FIGS. 2 and 4A-8C show where the boom 44 extends beyond an upper deck 48 of the nacelle 12. In this deployed condition, the boom 44 may be swung out beyond the side of the nacelle 12 to hoist payloads from ground level up to the nacelle 12.

Figure 5:
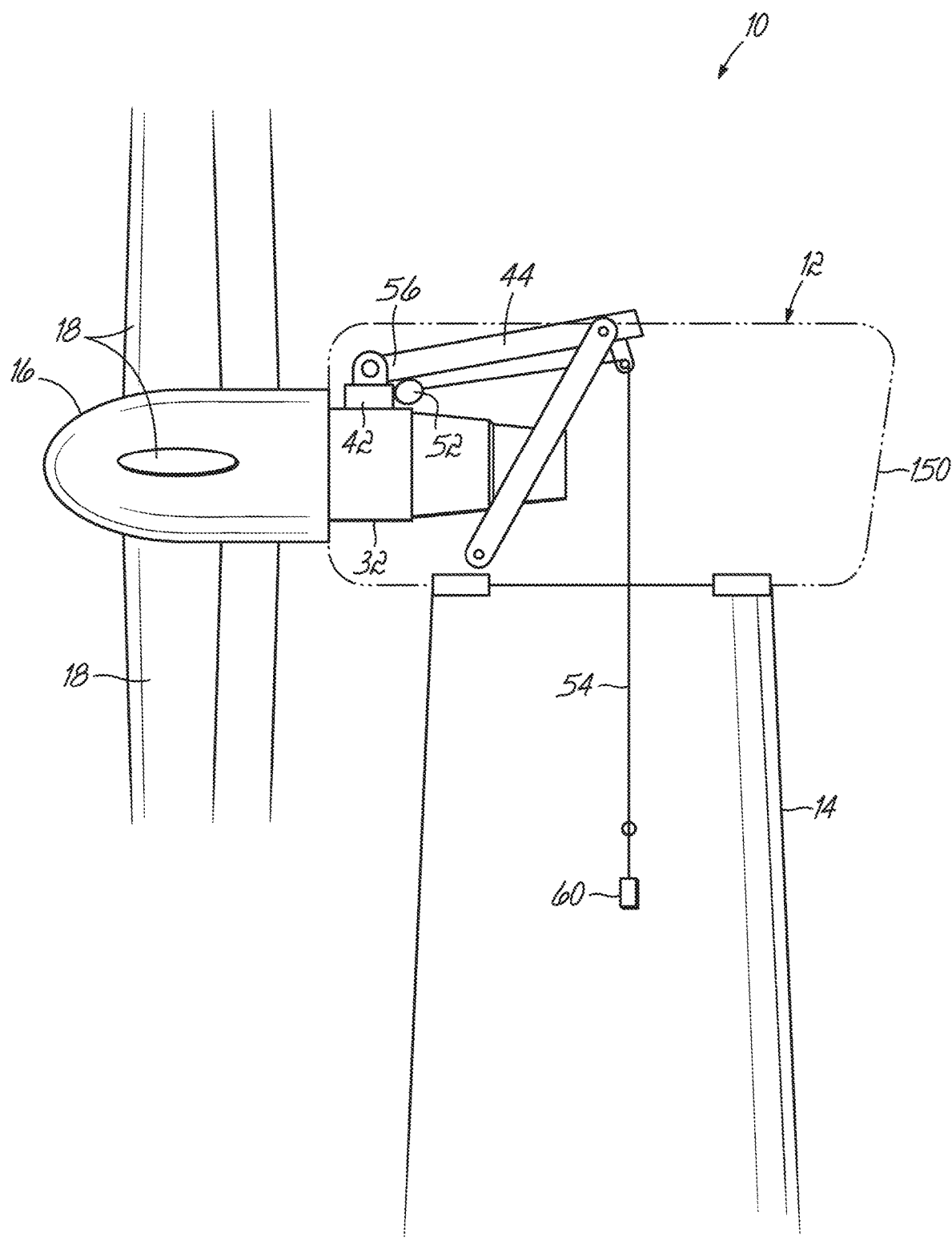
FIG. 5 is a schematic view of the nacelle with the integrated lifting apparatus coupled to the first temporary support.
Figure 6:
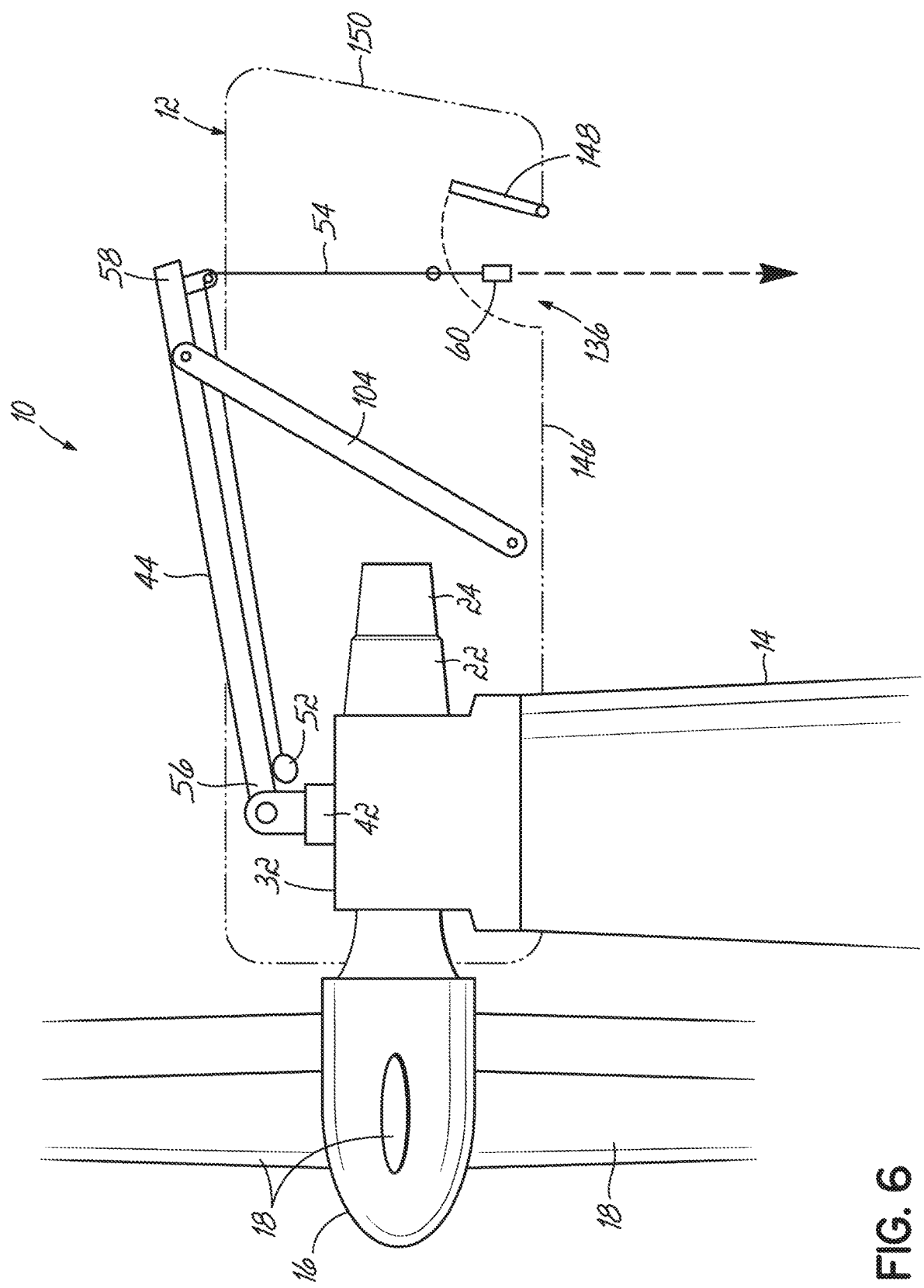
FIG. 6 is a schematic view similar to FIG. 5 but which shows an alternative configuration of nacelle and the integrated lifting apparatus.

As shown in FIG. 2, and more clearly in FIGS. 5 and 6, a first winch 52 may be provided near a base end 56 of the boom 44 that spools out a first lifting line 54. The first winch 52 may be a temporary high power winch that is lifted by the integrated lifting apparatus 40 up to the nacelle 12. Alternatively, while not shown, the first winch 52 may be located near the base of the wind turbine 10, located on a nearby vessel (for off-shore wind turbines), or located near the ground (for on-shore wind turbines). According to an exemplary embodiment, the first lifting line 54 may be in the form of a steel cable that is routed through a suspension point at a free end 58 of the boom 44 to terminate in a first lifting attachment 60, such as a hook. However, persons skilled in the art would appreciate that a variety of winches, lifting lines, and lifting attachments may be suitably utilized. It should be appreciated that the integrated lifting apparatus may include both permanent components (such as the extendible boom) and temporary components (such as different winches, and pulleys) that are operatively coupled to permanent aspects of the apparatus for replacing the wind turbine component, which results in using at least part of the integrated lifting apparatus. Using at least part of the integrated lifting apparatus may include using the extendible boom and one or more winches (permanent or temporary), and/or one or more or pulley systems (as will be described in relation to FIGS. 8A-C). For example, the original onboard winch installed on the integrated lifting apparatus may provide too little power, resulting in a larger and temporary first winch being used, possibly in addition to zo pulleys (not shown) being used both at the free end and near the first lifting attachment. Also, the diameter of the first lifting line (and the second lifting line for replacing the rotor blade shown in FIGS. 7A-8C) may be increased to adjust for the heavy load.

Having described the overall operation of the integrated lifting apparatus 40 in general terms, discussion will now turn to the more detailed construction of the frame structure 30 that provides the nacelle 12 with structural strength. As shown in FIG. 3, the frame structure 30 includes an outer sub-frame 62 that carries the outer skin 64 that defines the upper deck 48 and side walls 66 of the nacelle 12. Typically, the outer skin 64 will be in the form of metal panels, for example steel or aluminum or a composite construction, for example, glass-fibre reinforced plastic (GRP). However, persons skilled in the art would appreciate the outer skin 64 may be formed from any suitable material. The outer sub-frame 62 includes a plurality of vertical members 68 or 'stringers' that are generally C-shaped in form. The outer sub-frame 62 provides a rib-type structure for supporting the outer skin 64.

Figure 4A:
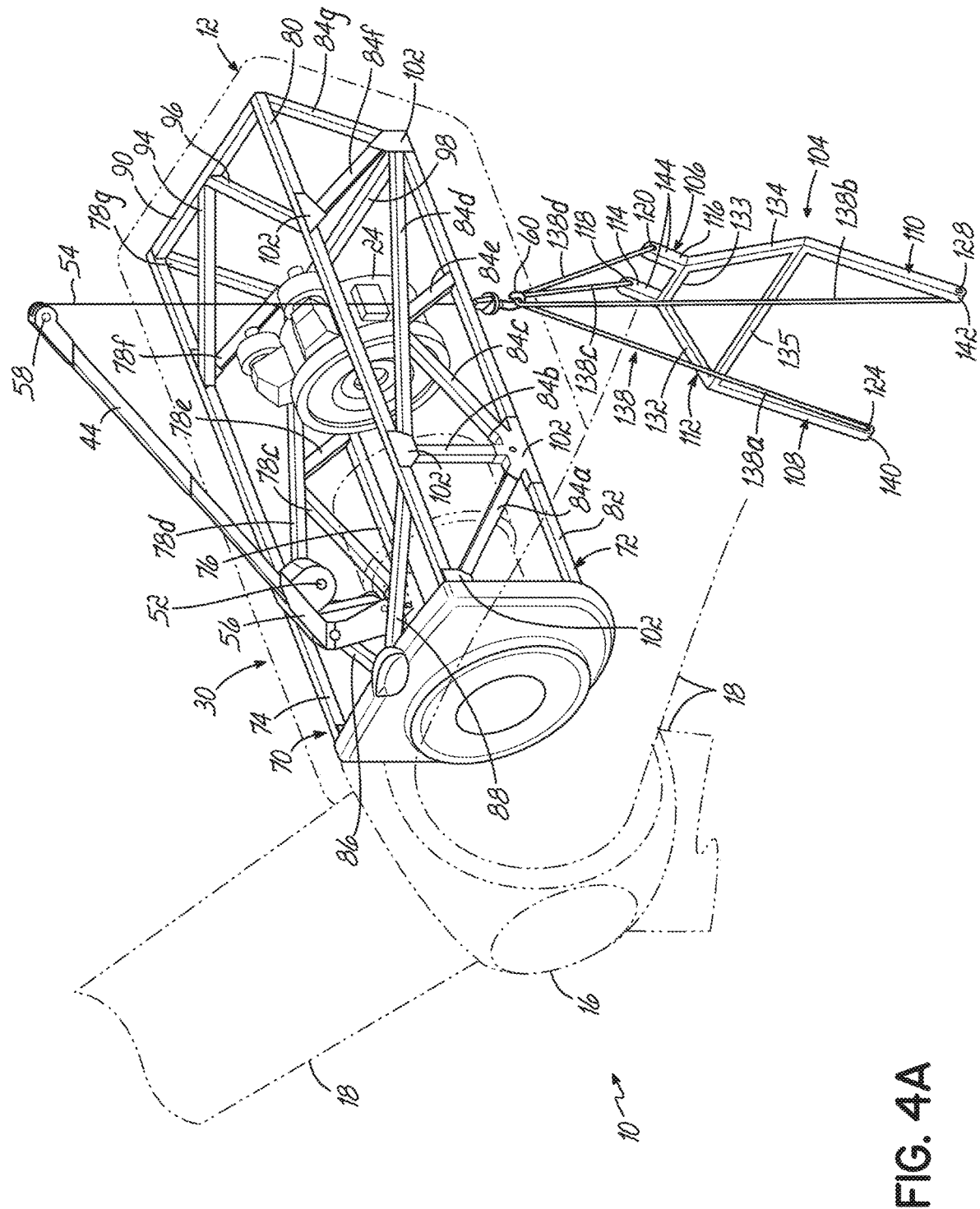
FIG. 4A is a perspective view of the first temporary support being lifted by the integrated lifting apparatus.
Figure 4B:
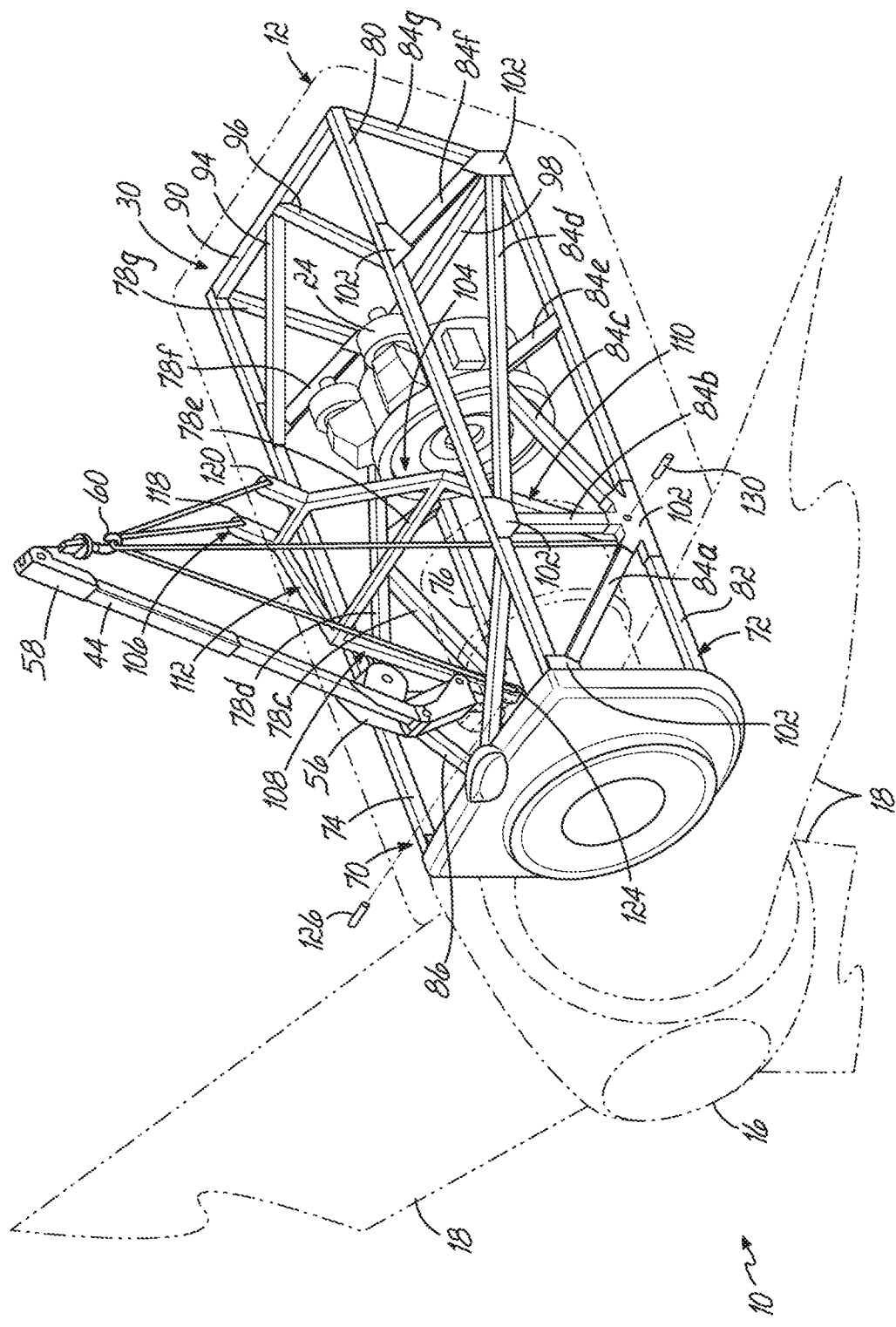
FIG. 4B is a perspective view of the first and second legs of the first temporary support being connected to the frame structure of the nacelle using the integrated lifting apparatus.
Figure 4C:
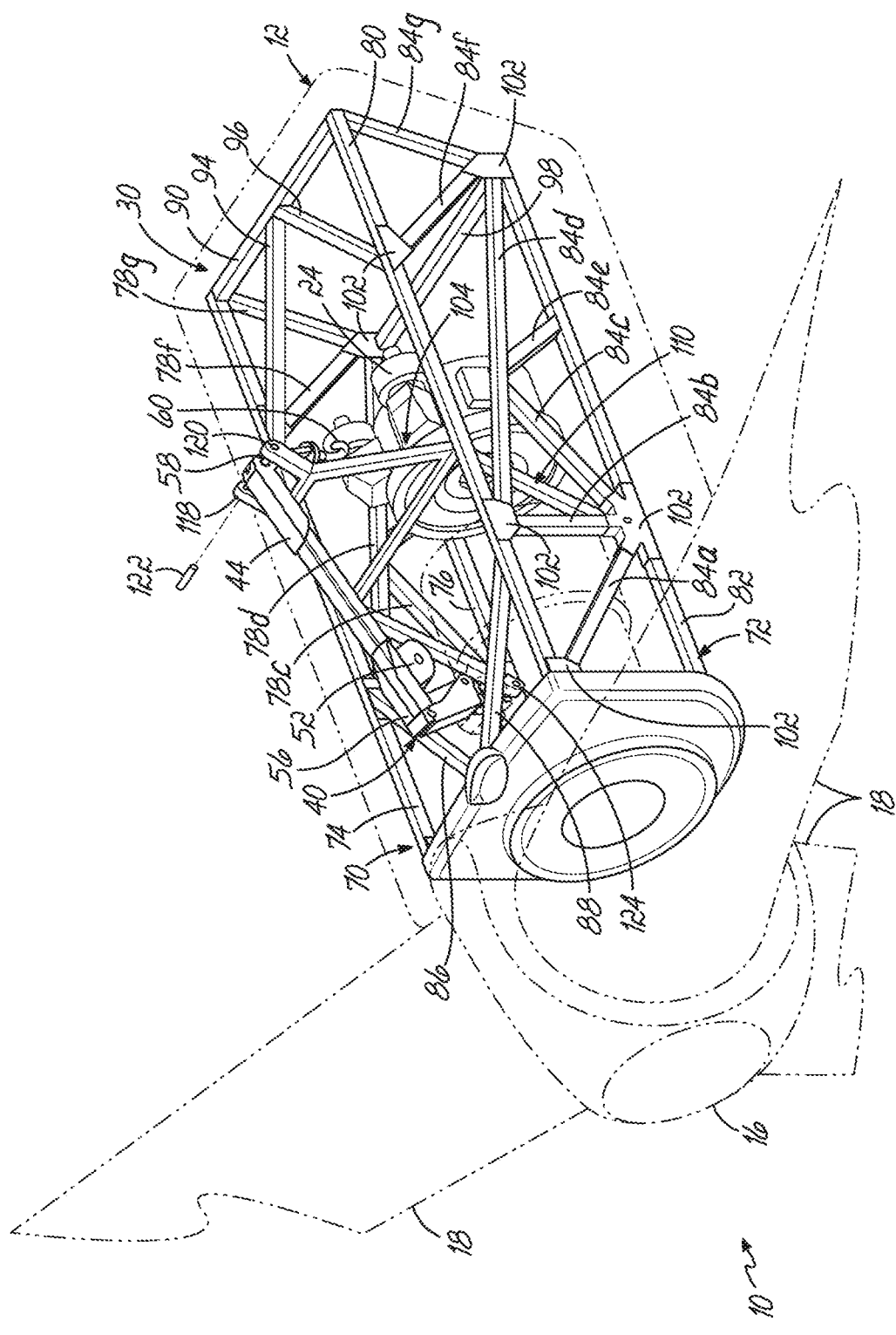
FIG. 4C is a perspective view of the first temporary support being coupled to the free end of the internal lifting apparatus.

FIGS. 4A-4C show an exemplary frame structure 30, however, it should be appreciated that the frame structure 30 may vary, and variations are not intended to fall outside the scope of the invention. As shown, frame structure 30 includes a first side 70 and a second side 72. The first side 70 includes a first side upper horizontal member 74, a first side lower horizontal member 76, and first side bridging members 78a-g (with 78a and 78b being hidden from view) extending therebetween. Similarly, the second side 72 includes a second side upper horizontal member 80, a second side lower horizontal member 82, and second side bridging members 84a-g extending therebetween.

First and second upper front bridging members 86, 88 separate the first side upper horizontal member 74 from the second side upper horizontal member 80, while a first upper rear bridging member 90 separates the first side upper horizontal member 74 from the second side upper horizontal member 80. Similarly, first and second upper rear bridging members 94, 96 separate the first side upper horizontal member 74 from the second side upper horizontal members 80, while a first lower rear bridging member 98 separates the first side zo lower horizontal member 76 from the second side lower horizontal member 82. Connector elements 102, such as gusset plates, may be included at some or all of the connection points of two or more members.

FIGS. 4A-4D illustrate a method of performing maintenance on a wind turbine component, such as the generator 24 or the gearbox 22 of a wind turbine 10, where the wind turbine component is located within the nacelle 12. However, it should be appreciated that other wind turbine components may also be removed using this method. In particular, FIGS. 4A-4D show the process of replacing the generator 24 located within the nacelle 12 using a first temporary support 104 in combination with the integrated lifting apparatus 40. For added clarity, many of the components of the wind turbine 10 have been removed entirely or shown using dashed lines, with only the frame structure 30 and its associated components, the integrated lifting apparatus 40 and its associated components, the generator 24, and the first temporary support 104 being shown.

There are many benefits to using the first temporary support 104 in combination with the integrated lifting apparatus 40 to perform maintenance on a wind turbine component. First, no jack-up vessel is necessary when a large component is to be repaired and/or replaced. Generally, jack-up vessels cost far more than other vessels due to the capacity and size. Other vessels, such as dynamic positioning vessels, are sufficient to carry the first temporary support 104 in combination with the large wind turbine component. Additionally, the integrated lifting apparatus 40 does not need to be significantly modified and/or can be retrofitted if needed. This allows the exemplary method to be performed on wind turbines 10 already in use. Further, the first temporary support 104 provides a truss-like structure that lessens the tension and compression stress concentrations, allowing for the lifting capacity of the integrated lifting apparatus 40 to be greatly increased. Using the integrated lifting apparatus 40 alone creates a significant moment, the effect of which is greatly reduced using the first temporary support 104.

While not shown, the first temporary support 104 may be brought to the wind turbine 10 using a variety of vehicles. For an off-shore wind turbine, the first temporary support 104 may be supplied to the wind turbine 10 by a helicopter or vessel, such as a dynamic positioning vessel. For an on-shore zo wind turbine, the first temporary support 104 may be supplied to the wind turbine 10 by a truck, train, or helicopter.

FIG. 4A shows the integrated lifting apparatus 40 moving relative to the nacelle 12 to lift the first temporary support 104. As shown, the first temporary support 104 may include a head portion 106, a first leg 108, a second leg 110, and a body portion 112 therebetween. The head portion 106 may include first and second frame members 114, 116 that may extend parallel each other and in a direction generally opposite the first and second legs 108, 110. The first and second frame members 114, 116 may each include first receiving structures 118, 120 that are configured to couple with a free end 58 of the integrated lifting apparatus 40 using a first connecting structure 122 (as shown in FIG. 4C). Preferably, the first temporary support 104 includes first and second legs 108, 110 that allow the first temporary support 104 to attach to first and second sides 70, 72 of the frame structure 30. However, persons skilled in the art would appreciate that the first temporary support 104 may have various different shapes and sizes, that may depend on the frame structure 30 and/or integrated lifting apparatus 40 to which the first temporary support 104 connects with.

As shown, the first leg 108 includes a second receiving structure 124 configured to couple to the frame structure 30 (or the hub 16 as will be discussed below with respect to FIGS. 7A-8C) using a second connecting structure 126. Similarly, the second leg 110 includes a third receiving structure 128 configured to couple to the frame structure 30 of the nacelle 12 using a third connecting structure 130. As shown, the first and second legs 108, 110 extend substantially parallel one another, however, this is not required. Additionally, the body portion 112 extends between the head portion 106 and the first and second legs 108, 110, and includes first and second oppositely angled frame members 132, 134 attached on the ends by first and second cross members 133, 135. As shown, the first cross member 133 connects the head portion 106, to the body portion 112, while the second cross member 135 connects the first and second legs 108, 110 to the body portion 112.

The integrated lifting apparatus 40 may lift the first temporary support 104 through the bottom of the nacelle 12 through hatch 136 (shown in FIG. 6) or through the top of the nacelle 12 through the first and second closable doors 50a and 50b (shown in FIG. 3). One or more temporary support lifting lines 138 (such as lifting lines 138a-d) may be attached to the first lifting attachment 60.

FIG. 4B shows the first and second legs 108, 110 of the first temporary support 104 being coupled to the frame structure 30. According to an exemplary embodiment, the first end 140 of the first leg 108 is coupled to the first side lower horizontal member 76 using a second connecting structure 126. Similarly, the first end 142 of the second leg 110 is coupled to the second side lower horizontal member 82 using a third connecting structure 130. While not shown, the first leg 108 may alternatively be coupled to the first side upper horizontal member 74, and/or at least one of the first side bridging members 78a-g or the main frame (not shown). Similarly, while not shown, the second leg 110 may be coupled to the second side upper horizontal member 80 and/or at least one of the second side bridging members 84a-g or the main frame.

FIG. 4C shows the second end 144 being coupled to a free end 58 of the integrated lifting apparatus 40 using a first connecting structure 122. For example, the first connecting structure 122, the second connecting structure 126, and/or the third connecting structure 130 may be one or more dowel pins that allow the first temporary support 104 to pivot. Alternatively or in addition dowel pins, the first, second and third connecting structures 122, 126, 130 includes one or more bolts if rigidity is desired at the connection point.

Figure 4D:
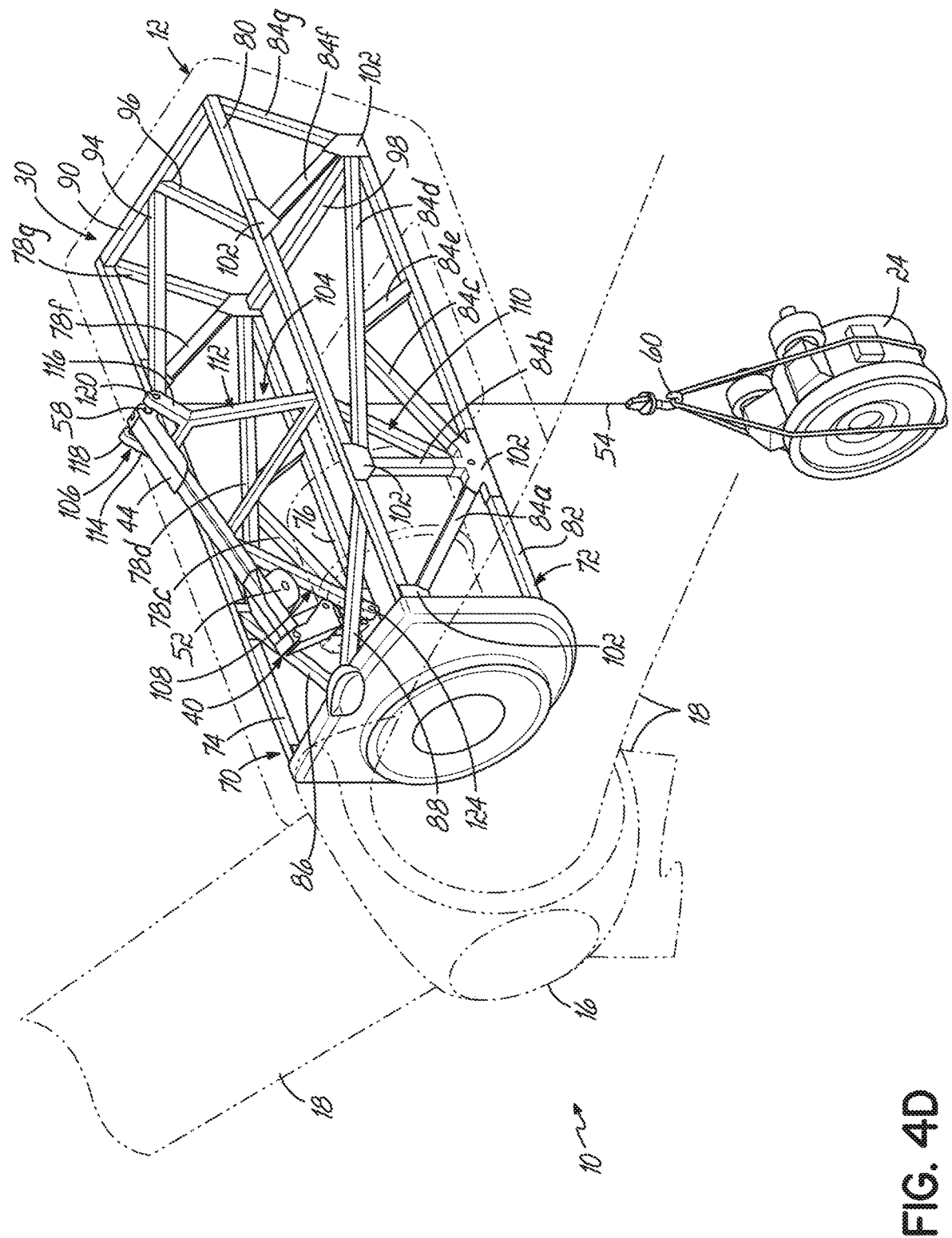
FIG. 4D is a perspective view of the integrated lifting apparatus and the first temporary support acting in combination to remove the generator from the nacelle.

FIG. 4D shows wind turbine component being removed using the integrated lifting apparatus 40 and the first temporary support 104 in combination. The wind turbine component being removed has a weight that exceeds the lifting capacity of the integrated lifting apparatus 40 alone, but does not exceed the lifting capacity of the integrated lifting apparatus 40 and the first temporary support 104 when used in combination.

The schematic cross-sections of FIGS. 5 and 6 will now be discussed for greater clarity. As shown in FIG. 5, the first lifting line 54 may be extendable down inside the interior of the tower 14. As shown in FIG. 6 and similarly shown in FIG. 4D, the integrated lifting apparatus 40 may remove the first temporary support 104 from the wind turbine 10 using the first winch 52 and the first lifting line 54 through a hatch 136 located on a bottom portion 146 of the nacelle 12. The reference position of first lifting line 54 may be above an aperture allowing the first lifting line 54 to extend down the outside of the tower 14 (as shown in FIG. 6). As shown, the nacelle 12 extends zo rearward from the tower 14 to define a significant overhang, with the bottom portion 146 of the overhang defining a hatch 136, which may be permanently open or may use a closure device, such as a pivoted door 148. The integrated lifting apparatus 40 is configured so that the free end 58 of the boom 44 is positioned over the hatch 136. The first lifting attachment 60 at the end of the first lifting line 54 is therefore able to be extended down through the hatch 136 to lower items to the ground or to lift items to the nacelle 12 from the ground. The hatch 136 is provided in a location that is reachable by the integrated lifting apparatus 40, for example through a rear wall 150 of the nacelle 12, so that wind turbine components both large and small may be lifted and lowered outside of the tower 14.

Inserting a replacement wind turbine component is performed using many of the same steps as described above, but in reverse. For example, the integrated lifting apparatus 40 and the first temporary support 104 are used in combination to insert the replacement wind turbine component through the hatch 136 located on the bottom portion 146 of the nacelle 12 or through the first and second closable doors 50a and 50b of the nacelle 12.

Similar to FIG. 4B, the first end 140 of the first temporary support 104 may then be decoupled from the nacelle 12. Accordingly, the first leg 108 may be decoupled from the first side lower horizontal member 76 and the second leg 110 may be decoupled from the second side lower horizontal member 82. While not shown, the first leg 108 may alternatively be decoupled from the first side upper horizontal member 74, and/or at least one of the first side bridging members 78a-e. Similarly, the second leg 110 may be decoupled to the second side upper horizontal member 80 and/or at least one of the second side bridging members 84a-e.

Similar to FIG. 4C, the first temporary support 104 may then be decoupled from the free end 58 of the integrated lifting apparatus 40 by removing the first connecting structure 122. The first temporary support 104 is then removed from the wind turbine 10 using the integrated lifting apparatus 40. Replacing the large wind turbine component in this exemplary manner, prevents the need for a jack-up vessel as described above, which saves both time and money. Additionally, using the first temporary support 104 in combination with the integrated lifting apparatus 40 greatly increases the lifting capacity of the zo integrated lifting apparatus 40 without significantly increasing its size and weight.

According to another exemplary embodiment shown in FIGS. 7A-8C, the wind turbine component being replaced is a rotor blade 18. Discussion of this embodiment includes many of the same elements as the previously described embodiment, and these elements have been provided with similar reference numbers where the shown elements are substantially similar or identical. This exemplary embodiment utilizes the integrated lifting apparatus 40 in combination with both the first temporary support 104 and the second temporary support 152, as will be discussed in greater detail below.

In this embodiment, the second temporary support 152 is lifted using the integrated lifting apparatus 40 in much the same manner as described above with respect to the first temporary support 104. Likewise, the second temporary support 152 is coupled to the frame structure 30 in much the same manner as the first temporary support 104, and will now be described in greater detail.

Figure 7A:
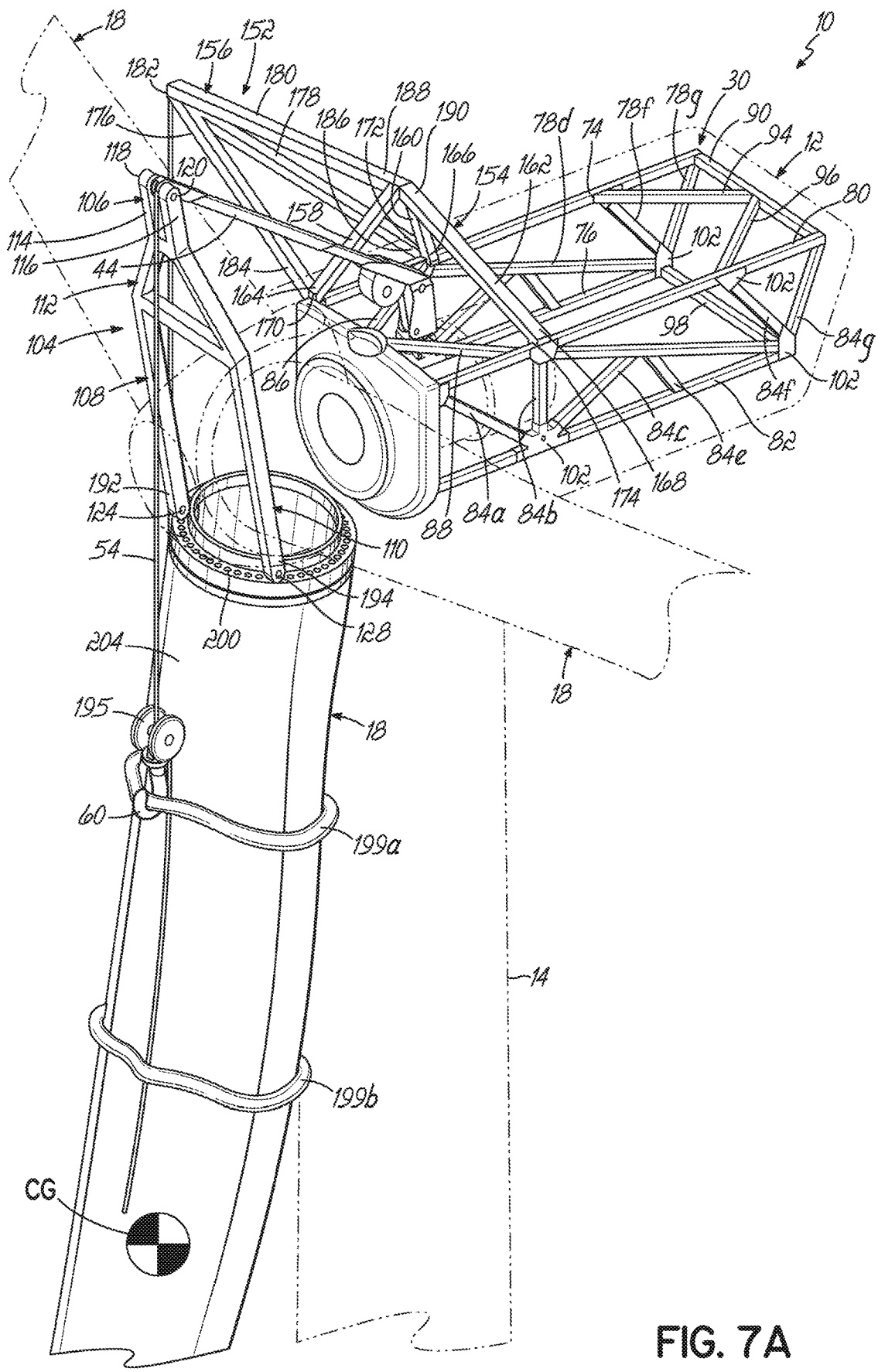
FIG. 7A is a schematic perspective view of showing the wind turbine with the first temporary support coupled to the hub and the second temporary support coupled to the frame structure of the nacelle.
Figure 7B:
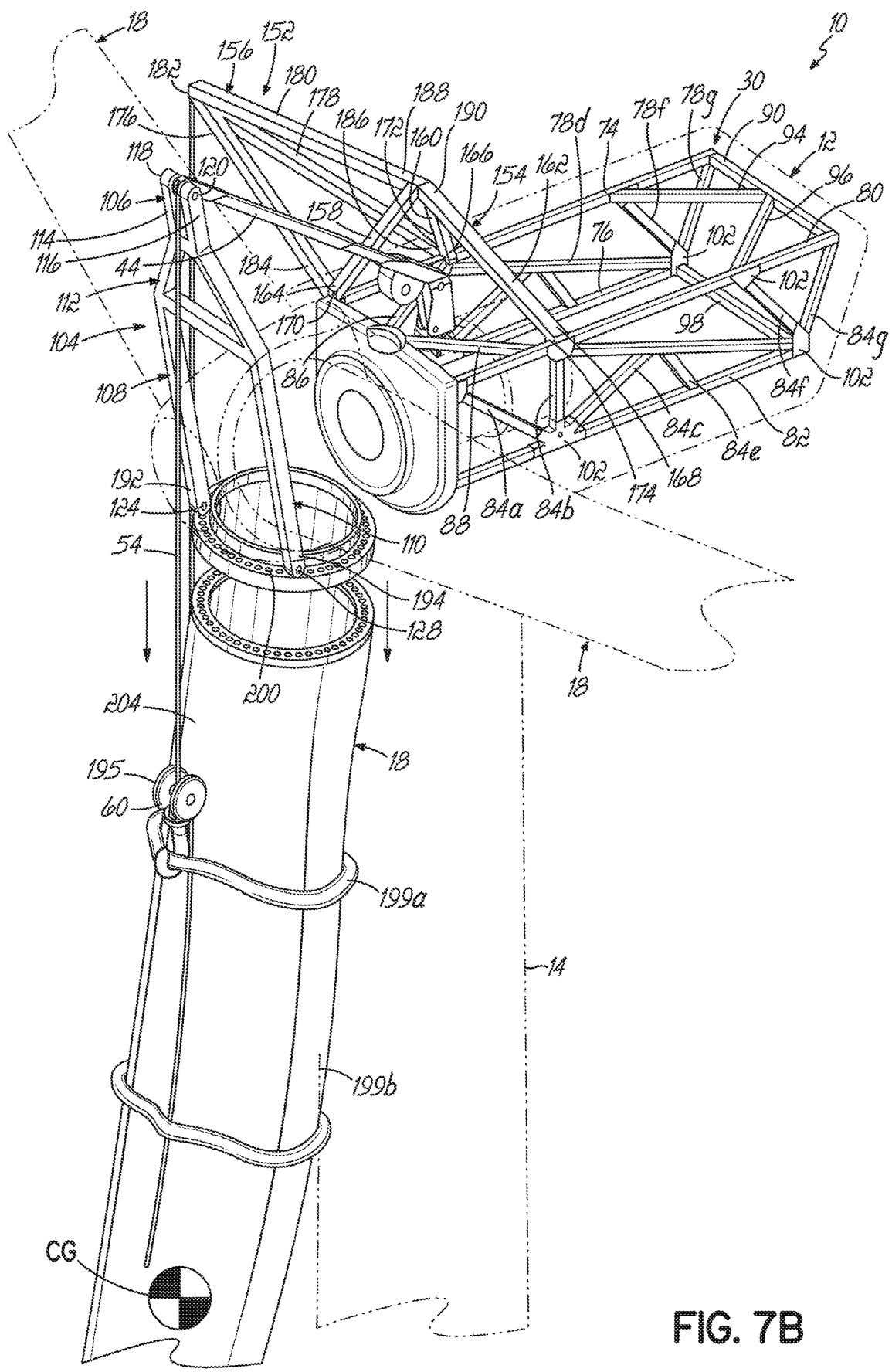
FIG. 7B is a schematic perspective view as the rotor blade is being removed.

As shown in FIGS. 7A and 7B, the second temporary support 152 may include an attachment portion 154 and an outwardly extending portion 156. However, persons skilled in the art would appreciate that the second temporary support 152 may have various different shapes and sizes. The attachment portion 154 may include a first attachment member 158, a second attachment member 160, and third attachment member 162, which may each be attached to the frame structure 30. As shown, the first end 164 of the first attachment member 158 may be attached to the first side upper horizontal member 74 using a fourth connecting structure 170, the first end 166 of the second attachment member 160 may be attached to the first side upper horizontal member 74 using a fifth connecting structure 172, and the first end 168 of the third attachment member 162 may be attached to the second side upper horizontal member 80 using a sixth connecting structure 174.

Further as shown, the outwardly extending portion 156 may include a first outwardly extending member 176, a second outwardly extending member 178, and a third outwardly extending member 180 that may each terminate at a first end to create a second lifting location 182 outside of the nacelle 12. The second end 184 of the first outwardly extending member 176 may be attached directly to the frame structure 30, shown as the first side upper zo horizontal member 74, or alternatively, may be attached to the first end 164 of the first attachment member 158. Similarly, the second end 186 of the second outwardly extending member 178 may be directly attached to the frame structure 30, shown as the first side upper horizontal member 74, or alternatively, may be attached to the first end 166 of the second attachment member 160. As shown in FIGS. 7A and 7B, the second end 188 of the third outwardly extending member 180 may be attached to the second ends 190 of the first, second, and third attachment members 158, 160, 162 at a rigid connection point.

After the second temporary support 152 is sufficiently coupled to the frame structure 30 of the nacelle 12, the integrated lifting apparatus 40 may be completely disconnected from the second temporary support 152, so that the integrated lifting apparatus 40 may lift the first temporary support 104. Once lifted, the first temporary support 104 is coupled to hub 16 shown in FIGS. 7A and 7B (using dashed lines). According to an exemplary embodiment, the first leg 108 of the first temporary support 104 may be coupled to a first attachment location 192 of the hub 16 and the second leg 110 of the first temporary support 104 may be coupled to a second attachment location 194 of the hub 16.

Similar to above, the integrated lifting apparatus 40 may include a system of winches, pulleys, lifting lines, and lifting attachments. For example, as shown, the integrated lifting apparatus 40 may include the first winch 52, the second winch (not shown), the first and second pulley system 195,196, first and second lifting lines, 54, 198, a first lifting attachment 60 and a second lifting attachment (not shown). As previously discussed, the first and second winches, first and second pulley systems 195, 196 and first and/or second lifting lines 54, 198 may be temporary resulting in using only part of the integrated lifting apparatus 40. As most clearly shown in FIGS. 7A and 7B, one or more flexible supports 199a, 199b may help to support the rotor blade 18 while it is being removed. As shown, a portion of the first lifting line 54 is placed between the rotor blade 18 and the flexible supports 199a, 199b for increased control and support.

FIG. 7B shows the rotor blade 18 being disconnected from the hub 16 using the integrated lifting apparatus 40 in combination with the first temporary support 104, and the second temporary support 152. As shown, the attachment structure connecting the rotor blade 18 to the hub 16 have been removed allowing the flange 200 of the rotor blade 18 to be separated from the hub 16.

Figure 8A:
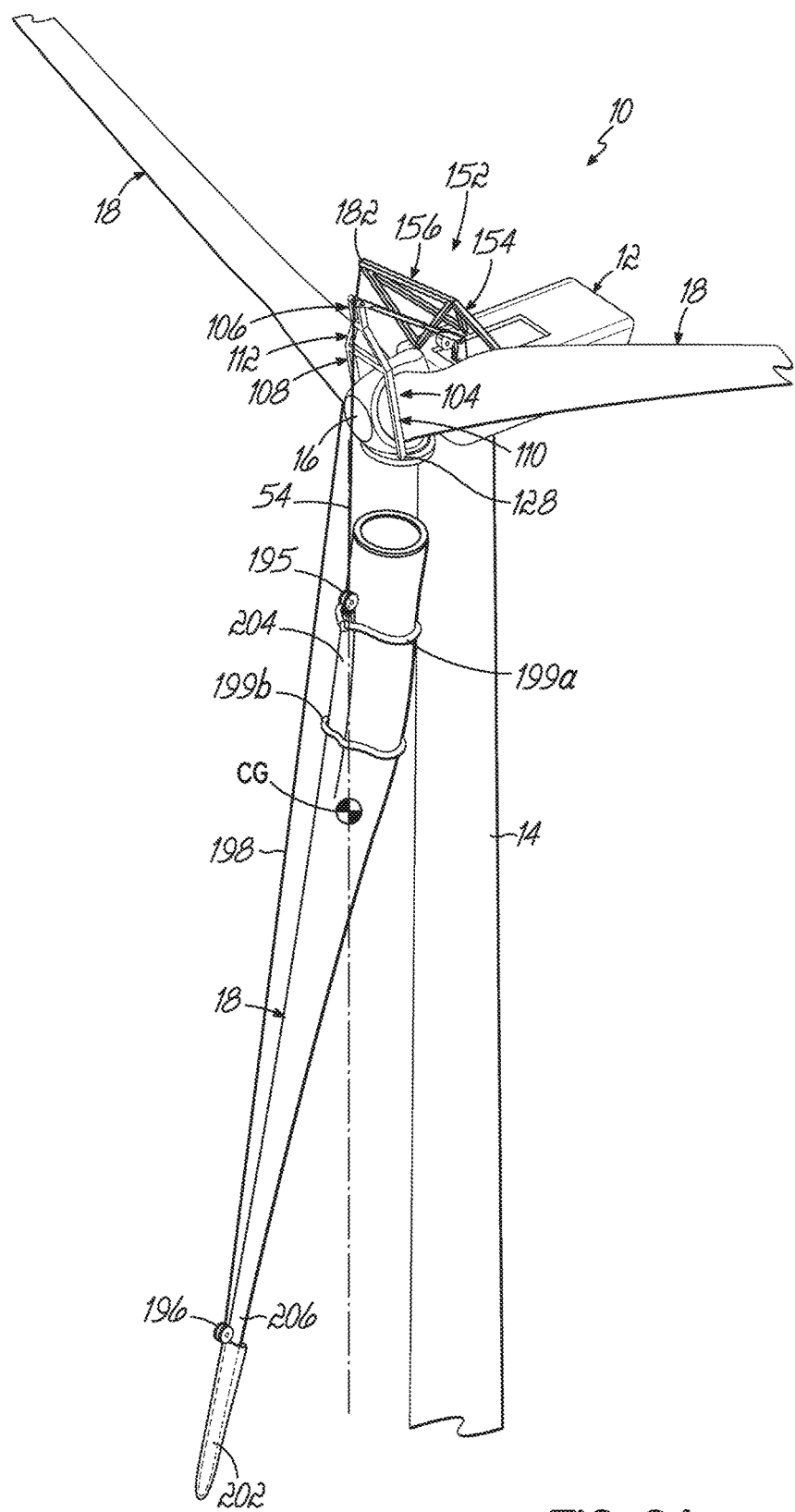
FIG. 8A is a schematic perspective view of the rotor blade being lowered using first and second lifting lines.
Figure 8B:
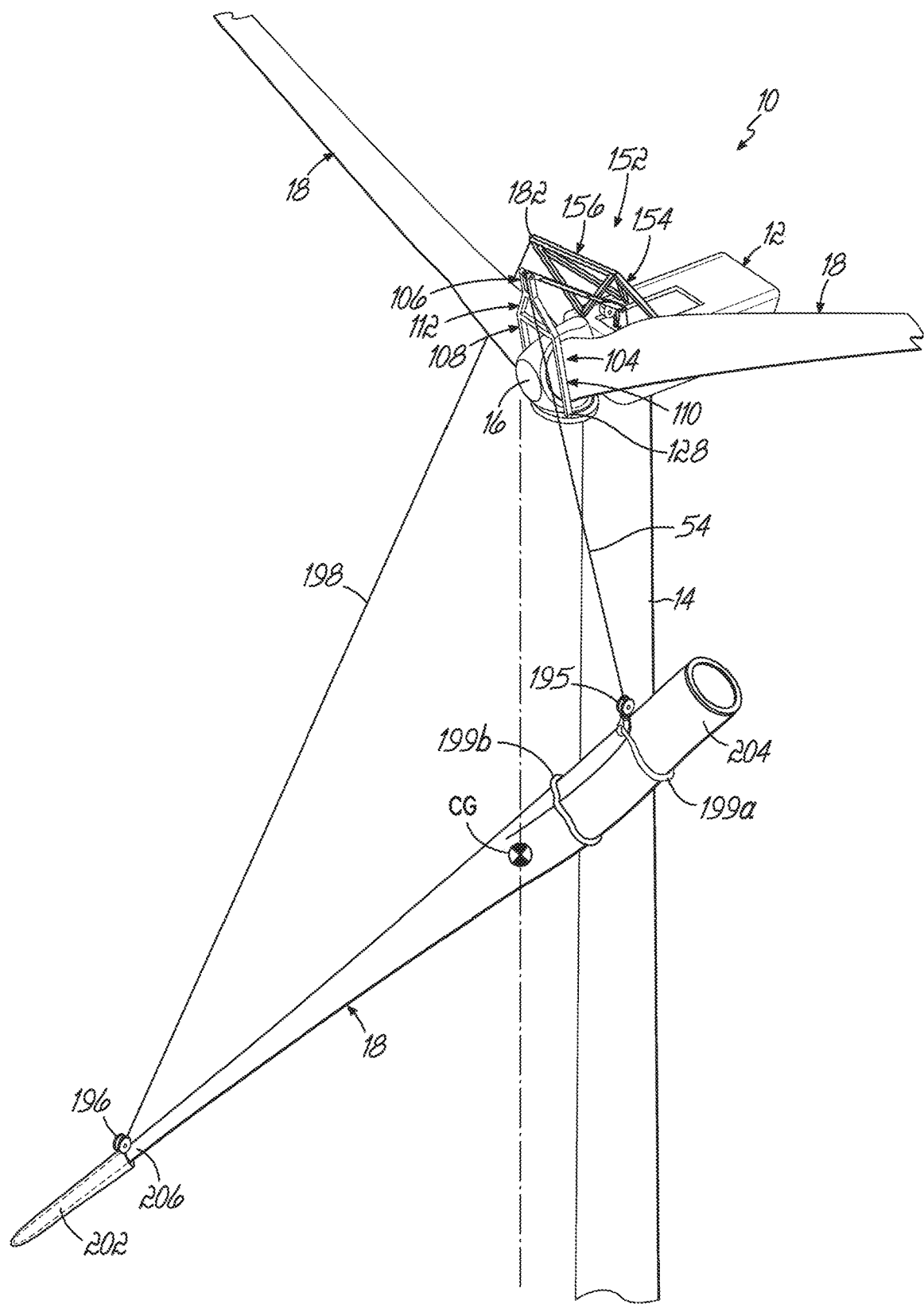
FIG. 8B is a schematic perspective view of the rotor blade being rotated using first and second lifting lines.
Figure 8C:
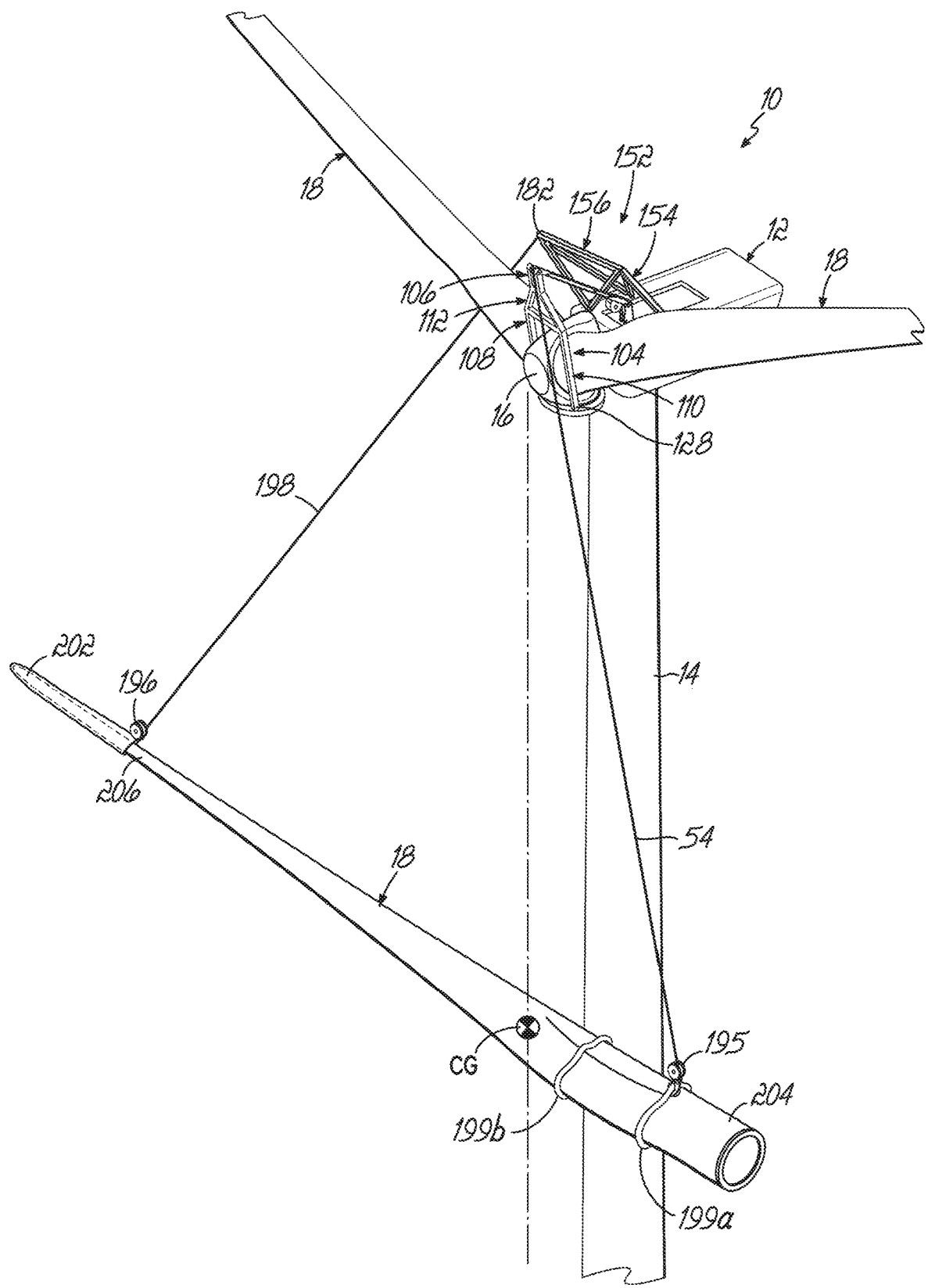
FIG. 8C is a schematic perspective view of the rotor blade being generally perpendicular to the tower as the rotor blade is being lowered.

In removing the rotor blade 18, special attention is given to the center of gravity (CG) of the rotor blade 18 as will now be discussed with respect to FIGS. 8A-8C. FIGS. 8A-8C show schematic illustrations of the rotor blade 18 being removed and lowered. The first temporary support 104 is aligned to the center of gravity of the rotor blade 18. As shown in FIG. 8A, the rotor blade 18 is lowered using the first lifting line 54, the first winch 52, the integrated lifting apparatus 40 and the first temporary support 104 in combination. The second lifting line 198 may be free or taut and may be removably connected to the rotor blade 18 using a sleeve, for example in the form of a sack or sling, that is fitted over the tip of the rotor blade 18 when the rotor blade 18 is in a stationary position.

Once the rotor blade 18 is lowered to the desired height, the rotor blade 18 is rotated as shown in FIG. 8B to be generally perpendicular to the tower 14. Rotating the rotor blade 18 is performed by attaching a first lifting line 54 to a first rotor portion 204 and a second lifting line 198 to a second rotor portion 206. The first rotor portion 204 of the rotor blade 18 may be supported using the first lifting line 54, the first winch 52, the integrated lifting apparatus 40, and the first temporary support 104 in combination. Similarly, the second rotor portion 206 of the rotor blade 18 may be supported using the second temporary support 152 in combination with the second pulley system 196 and the second lifting line 198. In this exemplary embodiment, the rotor blade 18 may have a weight that exceeds the lifting capacity of the integrated lifting apparatus 40 if used alone, but does not exceed the lifting capacity of the integrated lifting apparatus 40 together with the first temporary support 104 and the second temporary support 152 when used in combination in the manner described above.

Once the rotor blade 18 is removed, a replacement rotor blade may be inserted in much the same manner as described above regarding the removal of the rotor blade 18, but with the steps performed in reverse. While not shown, according to an alternative embodiment, the second temporary support 152 may be decoupled from the nacelle 12 prior to the first temporary support 104 being decoupled from the hub 16 using the integrated lifting apparatus 40.

According to this exemplary embodiment, after removing the first temporary support 104, the second temporary support 152 may be decoupled from the nacelle 12 by removing the fourth, fifth and six connecting structures 170, 172, 174. The second temporary support 152 may then be removed using the integrated lifting apparatus 40, as similarly discussed above with respect to the first temporary support 104.

Replacing the rotor blade 18 in this exemplary manner, prevents the need for a jack-up vessel as described above, which saves both time and money. Additionally, using the first temporary support 104 and the second temporary support 152 greatly increases the lifting capacity of the integrated lifting apparatus 40 without significantly increasing the size and weight of the integrated lifting apparatus 40.

While the present invention has been illustrated by the description of various embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A method of performing maintenance on a wind turbine component of a wind turbine, the wind turbine including a tower, a nacelle, a hub, and at least one rotor blade, wherein the nacelle includes an integrated lifting apparatus having an extendible boom that forms a permanent part of the wind turbine, the method comprising:

lifting a first temporary support using at least part of the integrated lifting apparatus;

coupling a first end of the first temporary support to the nacelle or the hub and a second end of the first temporary support to the integrated lifting apparatus;

removing the wind turbine component using at least part of the integrated lifting apparatus and the first temporary support in combination;

installing a replacement wind turbine component using at least part of the integrated lifting apparatus and the first temporary support in combination;

decoupling the first end of the first temporary support from the nacelle or the hub and the second end of the first temporary support from the integrated lifting apparatus; and removing the first temporary support from the wind turbine using at least part of the integrated lifting apparatus.

2. The method of claim 1, wherein using at least part of the integrated lifting apparatus further includes using the extendible boom.

3. The method of claim 1, wherein the nacelle includes a frame structure, wherein:

coupling the first end of the first temporary support to the nacelle or the hub further includes coupling the first end of the first temporary support to the frame structure, and decoupling the first end of the first temporary support to the nacelle or the hub further includes decoupling the first end of the first temporary support from the frame structure.

4. The method of claim 1, wherein the nacelle includes a frame structure and the first end of the first temporary support includes first and second legs, wherein:

coupling the first end of the first temporary support further includes coupling the first leg of the first temporary support to a first side of the frame structure, and the second leg of the first temporary support to a second side of the frame structure; and decoupling the first end of the first temporary support further includes decoupling the first leg of the first temporary support from the first side of the frame structure and the second leg of the first temporary support from the second side of the frame structure.

5. The method of claim 1, wherein removing the wind turbine component further includes removing the wind turbine component having a weight that exceeds the lifting capacity of the integrated lifting apparatus alone, but does not exceed the lifting capacity of the integrated lifting apparatus and the first temporary support when used in combination.

6. The method of claim 1, wherein removing the wind turbine component further includes removing a generator or a gearbox.

7. The method of claim 1, wherein the wind turbine component is located within the nacelle and wherein:

lifting the first temporary support further includes lifting the first temporary support into the nacelle through one or more closeable doors located on a top portion of the nacelle, removing the wind turbine component further includes removing the wind turbine component down through a hatch located on a bottom portion of the nacelle, and installing the replacement wind turbine component further includes inserting the replacement wind turbine component up through the hatch located on the bottom portion of the nacelle.

8. The method of claim 1, wherein the wind turbine component is a rotor blade, the method further comprising:

lifting a second temporary support using the integrated lifting apparatus; and coupling the second temporary support to the nacelle, wherein removing the rotor blade further includes using at least part of the integrated lifting apparatus, the first temporary support, and the second temporary support in combination, and wherein installing a replacement rotor blade further includes using at least part of the integrated lifting apparatus, the first temporary support, and the second temporary support in combination.

9. The method of claim 8, wherein the integrated lifting apparatus further includes first and second pulley systems, and first and second lifting lines, wherein removing the rotor blade further includes:

aligning the first temporary support to the center of gravity of the rotor blade;

disconnecting the rotor blade from the hub;

lowering the rotor blade using the first lifting line, the first pulley system, the integrated lifting apparatus and the first temporary support in combination; and rotating the rotor blade to be generally perpendicular to the tower using the first lifting line, the first pulley system, the extendible boom and the first temporary support in combination to support a first rotor portion and the second temporary support, the first pulley system and the second lifting line supporting a second rotor portion.

10. The method of claim 8, wherein coupling the first and second ends further includes coupling the first end of the first temporary support to the hub and the second end of the first temporary support to the integrated lifting apparatus.

11. The method of claim 10, wherein the hub includes first and second attachment locations and the first end of the first temporary support includes first and second legs, wherein:

coupling the first end of the first temporary support further includes coupling the first leg of the first temporary support to a first attachment location and the second leg of the first temporary support to a second attachment location; and decoupling the first end of the first temporary support further includes decoupling the first leg of the first temporary support from the first attachment location and the second leg of the first temporary support from the second attachment location.

12. The method of claim 9, further including:

decoupling the second temporary support from the nacelle; and removing the second temporary support from the nacelle using at least part of the integrated lifting apparatus.

13. The method of claim 9, wherein removing the rotor blade further includes removing the rotor blade having a weight that exceeds the lifting capacity of the integrated lifting apparatus alone, but does not exceed the lifting capacity of the integrated lifting apparatus and the first and/or second temporary supports when used in combination.

14. The method of claim 1, wherein the integrated lifting apparatus further includes a first winch, a first lifting line and a power system, the method further comprising:

articulating the integrated lifting apparatus on a base fixed to the nacelle allowing the integrated lifting apparatus to move in azimuth and in elevation relative to the nacelle to lift and/or remove the first temporary support.

15. A system for performing maintenance on a wind turbine component, the system comprising:

a wind turbine including a tower, a nacelle, a hub, at least one wind turbine blade, and an integrated lifting apparatus including an extendible boom that forms a permanent part of the wind turbine; and a first temporary support coupled to the nacelle or the hub and further coupled to at least part of the integrated lifting apparatus, wherein the lifting capacity of the integrated lifting apparatus and the first temporary support in combination is greater than the lifting capacity of the integrated lifting apparatus alone.

16. The system of claim 15, wherein the nacelle includes a frame structure, wherein the first temporary support is coupled to the frame structure.

17. The system of claim 15, wherein the nacelle includes a frame structure having first and second sides and the first temporary support includes first and second legs, wherein the first leg is coupled to the first side and the second leg is coupled to the second side.

18. The system of claim 15, further comprising a second temporary support, wherein second temporary support is coupled to the nacelle and the first temporary support is coupled to the hub.

19. The system of claim 15, wherein the extendible boom of the integrated lifting apparatus includes a free end, wherein the free end of the extendible boom is coupled to the first temporary support.

* * * * *